(12) United States Patent
Anderson (10) Patent No.: US 6,547,303 B1
(45) Date of Patent: Apr. 15, 2003

(54) PIVOTING SEATING SYSTEM (75) Inventor: Rick A. Anderson, Grand Haven, MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/928,393

(22) Filed: Aug. 13, 2001

(51) Int. Cl.$^7$ ................................................ B60N 2/02
(52) U.S. Cl. ................ 296/68; 297/344.21; 297/344.24
(58) Field of Search ............... 296/68; 297/344.21, 297/344.24

(56) References Cited

U.S. PATENT DOCUMENTS

| 2,036,118 A | * | 3/1936 | Carr ........................... 296/68 |
| 2,117,409 A | * | 5/1938 | Dorsey ........................ 296/68 |
| 2,587,679 A | * | 3/1952 | Atkinson ..................... 296/68 |
| 2,822,858 A | | 2/1958 | Mussler ....................... 296/68 |
| 2,992,852 A | | 7/1961 | Loofbourrow et al. ........ 296/68 |
| 3,051,522 A | | 8/1962 | Myers .......................... 296/68 |
| 3,104,911 A | | 9/1963 | James et al. .................. 296/68 |
| 3,253,856 A | | 5/1966 | Ueda ............................ 296/68 |
| 4,671,563 A | | 6/1987 | Shakespear ............... 296/66 X |
| 4,802,706 A | | 2/1989 | Onimaru et al. ............... 296/68 |
| 4,846,529 A | | 7/1989 | Tulley ......................... 297/349 |
| 5,474,353 A | | 12/1995 | Koester et al. ............ 296/68 X |
| 5,636,884 A | | 6/1997 | Ladetto et al. .............. 296/65.1 |
| 5,707,075 A | * | 1/1998 | Kraft et al. ............... 280/730.2 |
| 5,902,028 A | * | 5/1999 | Hsu et al. ..................... 312/271 |

FOREIGN PATENT DOCUMENTS

| EP | 0 627 337 A1 | 12/1994 |
| FR | 331023 | 8/1903 |
| GB | 525663 | 9/1940 |
| GB | 2 207 043 A | 1/1989 |
| JP | 61-36028 | 2/1986 |
| JP | 61-163034 | 7/1986 |
| JP | 2000-248828 | 9/2000 |

* cited by examiner

Primary Examiner—D. Glenn Dayoan
Assistant Examiner—Lori L Coletta
(74) Attorney, Agent, or Firm—Foley & Lardner (57) ABSTRACT A seating system for a vehicle having a rearwardly opening door relative to a seat. The seat having a seat cushion, seat back and a seat pivot rotatably connected to the vehicle for rotation of the seat about a vertical axis. At least one linkage is coupled between the seat cushion and a vehicle door. The linkage is sized and positioned such that the seat pivots in response to the door movement. The seat remains substantially adjacent to the vehicle door.

54 Claims, 7 Drawing Sheets

PIVOTING SEATING SYSTEM

TECHNICAL FIELD OF THE INVENTION

This invention generally relates to a seating system for a vehicle. More specifically, this invention relates to a seating system for a vehicle which enables a vehicle seat to be rotated about a vertical axis to allow easy ingress and egress when a vehicle door is opened.

BACKGROUND OF THE INVENTION

Conventional vehicles include seats which are generally fixed in a forward facing orientation and adjacent doors which pivot about a single axis between an opened position and a closed position. Although such conventional seats and doors have been employed in vehicles for years, such door and seating arrangements have several drawbacks. First, ingress and egress out of the vehicle is often difficult due to the minimum amount of space in front of the seat in a relatively small opening provided when the door is ajar. Ingress and egress into and from the vehicle is even more difficult for those with physical impairments or handicaps. With such seating and door arrangements, it is also extremely difficult to position a child in a child restraining unit or seat. As a result, there is a continuing need for a vehicle door and seating arrangement which provides easier ingress and egress into and from the vehicle and which enables a parent or other individual to more easily position a small child in a child restraining unit or seat.

Second, in addition to making it more difficult to enter or leave a vehicle, such seating and door arrangements also impose severe restrictions on the actual design of the vehicle door and the vehicle frame. Because the door pivots about a single axis, greater clearance between the door and the vehicle frame is required to enable the door to completely close. This greater clearance between the door and the vehicle frame results in an imperfect seal between the door and the frame creating noise and leakage concerns. Moreover, because the door pivots about a single axis, the opening provided when the door is ajar is limited in size. As a result, to provide a sufficiently sized opening to permit ingress and egress into and from the vehicle, the length of the door must be relatively large to provide an appropriate opening width. Because of overall size limitations, increasing the length of the door ultimately results in reduction in the size of the frame and reduced rigidity and strength of the vehicle frame. In addition, because the door pivots about a single axis between the closed and ajar positions, the door must generally extend in a vertical plane. As a result, there is a continuing need for a door arrangement that has reduced clearance requirements, that forms a better seal with the vehicle frame and that can be reduced in size and provided with an overall different configuration while still providing a driver or passenger with a sufficiently sized opening to easily exit or enter the vehicle.

SUMMARY OF THE INVENTION

Accordingly, this invention provides for a seating system for a vehicle that overcomes the problems and disadvantages of the conventional techniques in the art. The invention provides for a seating system that positions the seat at an angle relative to the opening created by the door and that pivots the seat in response to the opening and closing of the door.

According to one preferred embodiment, a vehicle includes a frame having a front, a rear, a first side and a second side, a door pivotably coupled to the frame, a seat pivotably coupled to the frame, a slot formed in one of the door and the seat, and an arm coupled to the other of the door and the seat. The arm has a portion slidably and rotatably disposed within the slot. As a result, pivotal movement of the door rotates the seat between a passenger riding position in which the seat faces a front of the frame and a passenger loading position in which the seat faces an opening formed between the door and the frame when the door is ajar.

According to another embodiment, a vehicle seating system for use with a vehicle having a front, a rear, a first side, a second side, a frame, a seat and a door pivotably supported proximate the seat is provided. The seating system includes a pivot support adapted pivotably support the seat relative to the frame, an elongate member adapted to be coupled to one of the door and the seat, and an arm adapted to be coupled to the other of the door and the seat. The elongate member includes an elongate slot. The arm has a portion slidably and rotatably disposed within the slot. Pivotal movement of the door rotates the seat.

According to another preferred embodiment, a vehicle includes a frame having a front, a rear, a first side and a second side, a door pivotably coupled to the frame, a seat pivotably coupled to the frame, and a slave link. The extension extends from the seat and has a portion pivotably coupled to the door at a first door location. The slave link has a first portion pivotably coupled to the frame and second portion pivotably coupled to the door at a second door location. Pivotal movement of the door rotates the seat between a passenger riding position in which the seat faces the front of the frame and a passenger loading position in which the seat faces an opening formed between the door and the frame when the door is ajar.

According to another preferred embodiment, a vehicle seating system for use with a vehicle having a front, a rear, a first side, a second side, a frame, a seat and a door is provided. The system includes a pivot support adapted to pivotably support the seat relative to the frame, an extension and a slave link. The extension extends from the seat and has a portion adapted to be pivotably coupled to the door at a first door location. The second link has a first portion adapted to be pivotably coupled to the frame and a second portion adapted to be pivotably coupled to the door at a second door location.

According to yet another preferred embodiment, a vehicle includes a frame having a front, a rear, a first side and a second side, a door having a front portion proximate the front of the frame and a rear portion proximate the rear of the frame, a seat pivotably coupled to the frame and at least one rigid member coupled to the seat and the door. The door is pivotably coupled to the frame proximate the rear portion of the door. Pivotal movement of the door rotates the seat between a passenger riding position in which the seat faces the front of the frame and a passenger loading position in which the seat faces an opening formed between the door and the frame when the door is ajar.

Further features and advantages of the invention will become apparent from the following discussion and accompanying drawings.

DETAILED DESCRIPTION OF THE PREFERRED EMBODIMENTS

The following description of the preferred embodiments is merely exemplary in nature, and is in no way intended to limit the invention or its application or uses.

Figure 1:
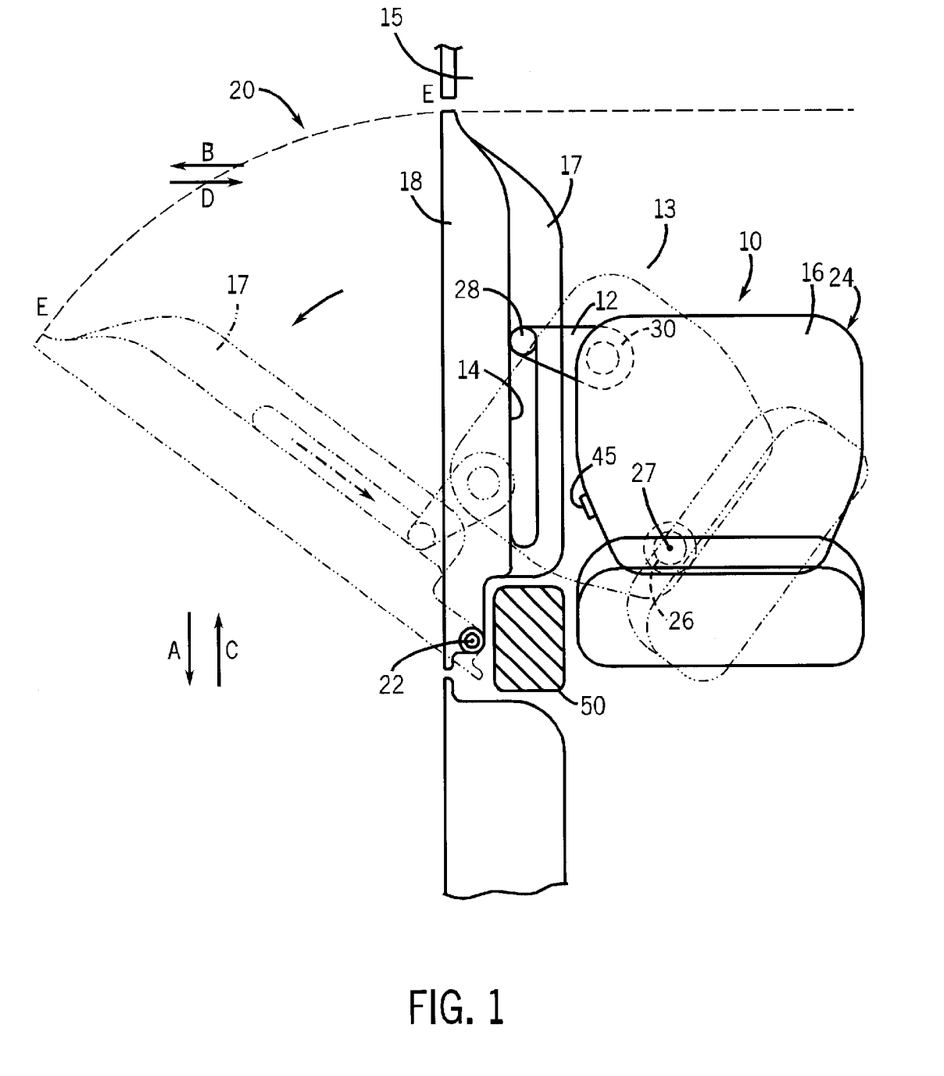
FIG. 1 is a fragmentary sectional view of a vehicle including a first preferred embodiment of a seating system with a door in a closed position (and with the door in a generally open position shown in phantom).

Referring to FIG. 1, there is shown a seating system 10 located adjacent the rear interior area 13 of a vehicle 20. Alternatively, the seating system 10 can be used in a seat located adjacent the front interior area 15 of vehicle 20. The seating system 10 includes a front arm or extension 12, a vehicle door 18 having an elongated member 17 which defines an elongated slot 14, a seat 24 having a cushion 16, and a seat pivot 26. The elongated slot 14 operably receives the arm 12. Although the seating system 10 may be used in any vehicle, seating system 10 is specifically designed to provide easy ingress and egress in a vehicle with a rearward hinged vehicle door 18.

The front arm or extension 12 has a first end 28 movably disposed within slot 14 of vehicle door 18 and a second end 30 fixably connected to the seat cushion 16. The front arm 12 is preferably shaped and sized to cooperate with the slot 14. The front arm 12 travels in an arcuate path as the seat 24 is rotated from the "passenger carrying position" to a "passenger loading position" and is guided within slot 14. In the preferred embodiment, the front arm 12 extends from a side of the seat cushion 16 adjacent vehicle door 18 and is arranged such that it does not position in front of the seat cushion 16 in the "passenger carrying position," "passenger loading position," or during the rotation of the seat 24 from one position to the other. In alternative embodiments, the front arm 12 can be shaped and arranged so that the front arm 12 does not position in front of the seat cushion 16 and allows that space to be free for the passenger's body to move from the seat 24 and in and out of the vehicle 20 through the "open space." In the preferred embodiment, the front arm 12 is sized at a length to maintain the seat cushion 16 within close proximity to the vehicle door 18.

Slot 14 is disposed within the interior side of vehicle door 18. The slot 14 is preferably formed as a channel that is positioned along the length of the vehicle door 18. In the preferred embodiment, the slot 14 extends from substantially near the door pivot axis 22 to approximately ⅔ the length of the vehicle door 18. This feature allows the slot 14 to guide the front arm 12 and also the attached seat cushion 16. In alternative embodiments, slot 14 may be of a variety of lengths so as to cooperate with front arm 12 and the geometry of the seat cushion 16, vehicle door 18 and the "open space" that is formed when the vehicle door 18 is ajar.

The vehicle door 18 is pivotably coupled to frame 50 of the vehicle 20 for pivotal movement about axis 22. In the preferred embodiment, axis 22 is disposed on a substantially rearward end of the vehicle door 18 so that the vehicle door 18 pivots rearwardly relative to the seat 24 and an "open space" forms such that a passenger can enter the seat 24 from a forward direction of the seat 24. Door 18 preferably includes a handle (not shown). The handle preferably extends along a substantial portion of the length of door 18. Because seat 24 extends substantially parallel to door 18 when door 18 is ajar, the handle along door 18 facilitates entry and exit into and from vehicle 20. The handle is especially helpful in assisting physically challenged individuals into and out of vehicle 20.

In the preferred embodiment, a seat pivot 26 rotatably couples the seat 24 and cushion 16 to the vehicle 20 for rotation about axis 27. Pivot 26 is preferably formed by a conventional pin and socket arrangement, but may alternatively include other suitable devices and arrangements. For example, in an alternative embodiment, seat 24 is pivoted or rotated by a conventionally known motorized device such as an electrical motor. In one particular embodiment, vehicle 20 includes a control circuit which generates a control signal in response to a signal received from a remote keyless entry. In response to the signal from the remote keyless entry, the control circuit generates the control signal which causes door 18 to unlatch (and possibly unlock) and further causes the motor to rotate or pivot the seat to move the door to an ajar position. In particular embodiments, the seat pivot 26 is configured to additionally rock or tip a front end of seat 24 downwardly or a rear end of seat 24 as seat 24 is rotated towards a side of vehicle 20. The seat pivot 26 may support the seat 24 at a substantial outboard edge of the seat 24. The seat pivot 26 permits the seat 24 to rotate about a vertical axis located at seat pivot 26. The rotation allows the seat to be rotated from a "passenger riding position" in which the seat 24 allows a passenger to face in a substantially forward direction of the vehicle 20 to a "passenger loading position" in which the seat 24 is angled toward the opening of the vehicle door 18 such that the seat 24 is directed towards the "open space." The angle of the seat 24 is preferably less than 90 degrees from the orientation of the seat 24 in the "passenger riding position." In the exemplary embodiment, seat 24 additionally includes a latch mechanism 45 coupled between seat 24 and frame 50 of vehicle 20. Latch mechanism 45 releasably retains seat 24 in the passenger carrying or passenger riding position.

The vehicle door 18 moves from a "closed position" (shown in FIG. 1) to an "open position" (shown also in FIG. 1 in phantom). During this movement, the vehicle door 18 is displaced in a rearward direction A and outward direction B such that the vehicle door 18 moves in a substantially arcuate shape indicated by arc line E—E. Conversely, if a vehicle door 18 is open and the vehicle door 18 moves from an "open position" (shown in FIG. 1) to a "closed position," the vehicle door 18 is displaced in a forward direction C and an inward direction D, thereby following the arcuate path indicated by arc line E—E. During movement of the vehicle door 18 from a closed position to an open position, the front arm 12 guides the pivotal movement of the seat 24 about a vertical axis 27 at seat pivot 26 from a generally forward position or "passenger carrying position" (as shown in FIG.

1) to a generally angled position or "passenger loading position," (also shown in FIG. 1 in phantom). During this pivotal movement, the seat 24 including the seat cushion 16 is displaced toward the "open space" created by the vehicle door 18. This displacement allows a passenger to more easily enter or exit the vehicle seat 24 because the front portion of the seat 24 is exposed to the opening created by the vehicle door 18.

Figure 2:
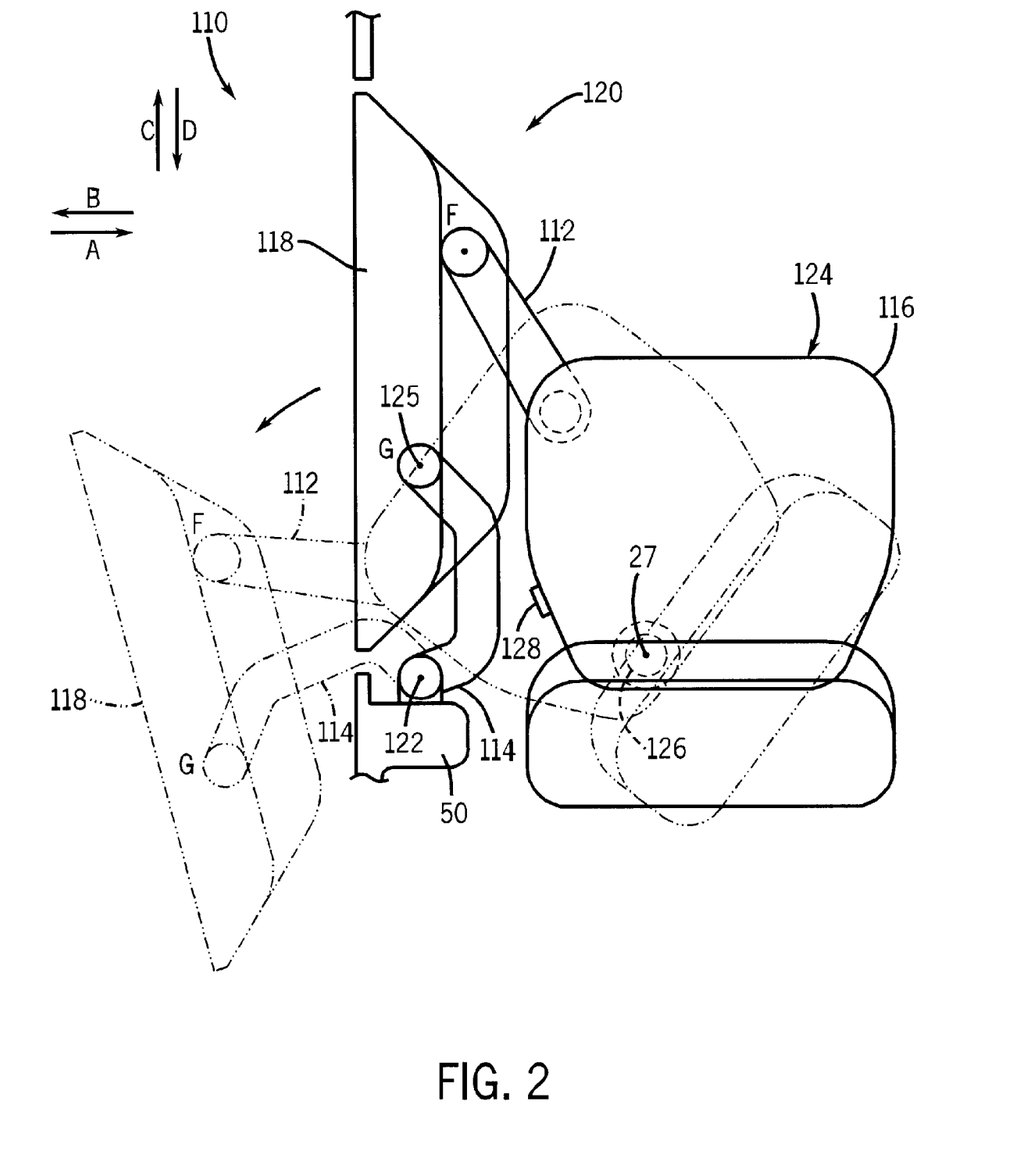
FIG. 2 is a plan view of a vehicle including a second preferred embodiment of the seating system with the door in a generally closed position (and with the door in a generally open position shown in phantom).

FIG. 2 illustrates seating system 110, a second preferred embodiment for use in vehicle 120. Seating system 110 includes extension 112, slave link 114 and a seat cushion 116 of a seat 124. Extension 112 extends from a front of seat cushion 116 and is coupled to the vehicle door 118.

Slave link 114 is coupled to vehicle 120 via a vehicle pivot 122 and to the vehicle door 118 via a door pivot 125. In the preferred embodiment, slave link 114 is rotatably coupled at vehicle pivot 122 and rotatably coupled at door pivot 125. In the preferred embodiment, slave link 114 is a substantially C-shaped member. This feature allows the vehicle door 118 to pivot greater than 90 degrees from the "passenger carrying position" and the vehicle door 118 can move outwardly and backwardly relative to the seat in a "passenger carrying position." In alternative embodiments, slave link 114 can be formed of a shape and size that cooperates with the geometry of the seat cushion 116, extension 112, and vehicle door 118 such that the seat cushion 116 is rotated to a desired "passenger loading position" relative to an "open space" created when the vehicle door 118 swings open. Additionally, extension 112 and the slave link 114 are arranged such that neither is located in front of the seat cushion 116 in the "passenger carrying position," "passenger loading position," or during the rotation of the seat 124 from one position to the other.

In the preferred embodiment, a seat pivot 126 rotatably couples the seat cushion 116 to the vehicle 120 and is formed by a conventional pin and socket arrangement, but may alternatively include other suitable devices and arrangements. The seat pivot 126 can be fixably coupled to the vehicle 120. The seat pivot 126 permits the seat 124 to rotate about a vertical axis located at seat pivot 126. During this rotation, the seat is rotated from a "passenger riding position," in which the seat 124 allows a passenger to face in a substantially forward direction of the vehicle 120 to a "passenger loading position," in which the seat 124 is angled toward the opening of the vehicle door. The angle of the seat 124 in the "passenger loading position" is preferably less than approximately 90 degrees from the "passenger riding position."

The seating system 110 further preferably includes a latch mechanism 128 for releasably locking the seat 124 when the seat 124 is the "passenger carrying position." The latch mechanism 128 includes a latch that prevents the seat 124 from rotating. As can be readily understood by a person of ordinary skill in the art, the latch mechanism 128 may also include other suitable devices.

As shown in FIG. 2, the vehicle door 118 moves from a closed position to an open or ajar position. During this movement, the vehicle door 118 is displaced in a rearward direction D and outward direction B such that the vehicle door moves in to a substantially arcuate shape indicated by arc line F—F and arc line G—G. Conversely, if a vehicle door is open and the vehicle door 118 moves from an open position (shown in FIG. 2) to a closed position (shown in phantom in FIG. 2), the vehicle door 118 is displaced in a forward direction C and an inward direction A thereby following the arcuate path indicated by arc line F—F and arc line G—G.

Seating system 110 pivots seat 124 between the passenger loading position and a passenger riding or carrying position while at the same time facilitates use of a floating door 118. As a result, door 118 more easily mates and seals with the frame of vehicle 120 because door 118 contacts the surrounding walls of the frame of the vehicle more simultaneously as compared to a conventional pivoting door wherein some perimeter portions of the door are undersealed and other perimeter portions of the door are oversealed. Consequently, seating system 110 reduces road noise and improves heating and cooling efficiency of vehicle 120. In addition, because door 118 generally moves in an over-and-in path during opening and closing of door 118, door 118 may be made thicker or may be provided with a greater thickness and a greater height. This greater thickness and height increases overall vehicle side impact strength and enables such features as airbags to be provided in door 118.

Figure 3:
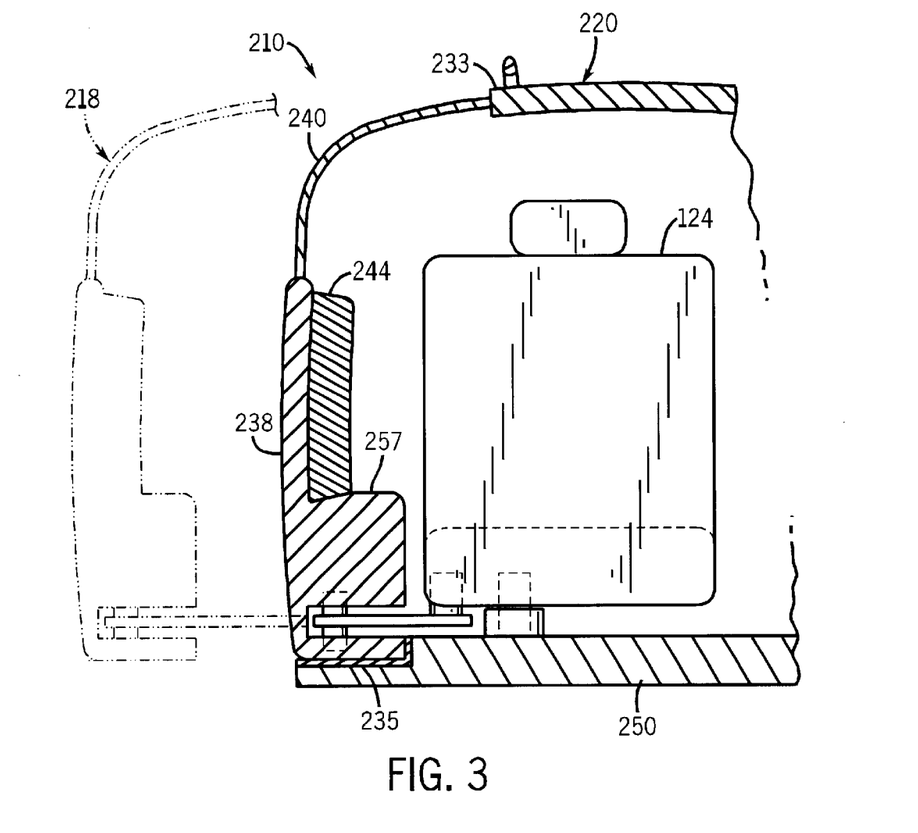
FIG. 3 is a fragmentary sectional view of a vehicle including a third preferred embodiment of the seating system with the door in a close position (and with the door in a generally open position shown in phantom).

FIG. 3 is a sectional view of seating system 210, an alternative embodiment of seating system 110 shown and described with respect to FIG. 2. Seating system 210 is similar to seating system 110 except that seating system 210 is provided as part of vehicle 220 and includes door 218 in lieu of door 18. Vehicle 220 is similar to vehicle 120, except that vehicle 220 has a frame 250 having an inwardly recessed roof portion 233 and floor portion 235. For ease of illustration, those remaining components of seating system 210 or vehicle 220 which correspond to similar components of seating system 110 of vehicle 120 are numbered similarly. As shown by FIG. 3, door 218 generally includes side portion 238 and overhang portion 240. Side portion 238 is coupled to extension 112 and slave link 114. In the illustrated embodiment, side portion 238 extends upwardly from floor portion 235 of vehicle frame 250 to a height approximately equal to the chest of an average person seated upon seat 124. Side portion 238 additionally includes a restraining system 244 mounted to side portion 238 and positioned so as to extend across the chest of an average sized person sitting upon seat 124. Restraining system 244 preferably comprises a conventionally known airbag. Alternatively, restraining system 244 may comprise other presently known or future developed restraining systems which expand, such as by inflation or other means, or otherwise move to restrain movement of the person seated in seat 124 during a collision. Because door 218 moves between a passenger loading position and the passenger riding position via extension 112 and slave link 114, door 218 may have a greater overall thickness, enabling door 218 to additionally include restraining system 244.

Overhang 240 extends upwardly from side portion 238 and towards a center line of vehicle 220. Overhang 240 preferably extends inwardly towards the center line of vehicle 220 beyond an innermost surface of side portion 238 such as sides of arm rest 257. Overhang 240 preferably extends over at least a portion of seat 124. At least portions of overhang 240 are preferably formed from transparent or translucent materials so as to enable light to pass through overhang 240 and so as to preferably enable a person within vehicle 220 to see through overhang 240. Although overhang 240 is illustrated as being composed substantially entirely of transparent material or translucent materials and is illustrated as extending over seat 24, overhang 240 may alternatively extend inwardly by differing extents and may have portions which are opaque or portions which are merely translucent. Overhang 240 may additionally be provided with portions which are tinted, polarized, or otherwise configured to block certain light wavelengths. Overhang 240 may also be formed from materials which have characteristics that may be selectively changed or that may automatically change in response to certain environmental factors such as brightness or temperature. Although not illustrated, overhang 240 may additionally be provided with adjacent panels which may be selectively moved between positions in which one or more panels extend at least partially over overhang 240 or in which the one or more panels are retracted relative to overhang 240. Furthermore, in alternative embodiments, overhang 240 itself may be selectively extendable and retractable for ventilation or other purposes.

Figure 3A:
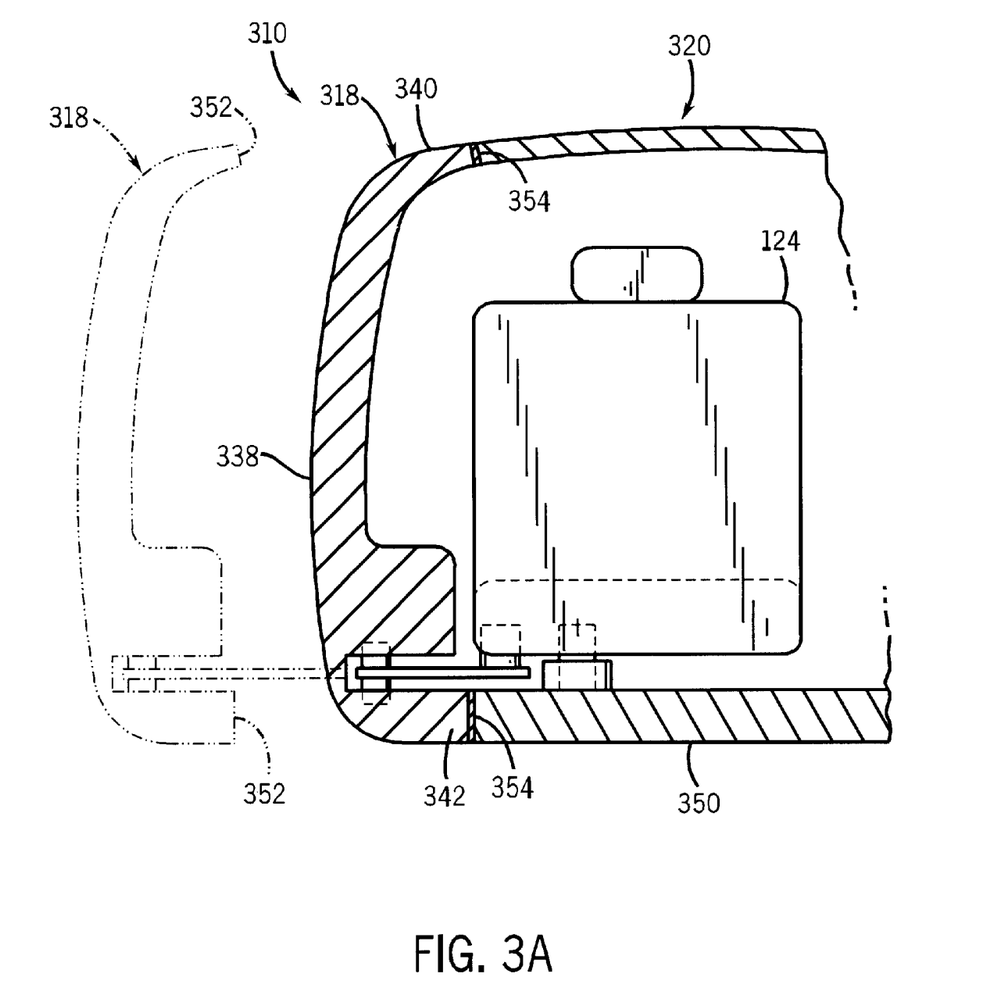
FIG. 3A is a fragmentary sectional view of a vehicle including a fourth preferred embodiment of the seating system with the door in a generally closed position (and with the door in a generally open position shown in phantom).

FIG. 3A illustrates seating system 310, a second alternative embodiment of seating system 110 included as part of vehicle 320. Seating system 310 is similar to seating system 210 except that seating system 310 includes door 318 in lieu of door 218. Door 318 is similar to door 218, except that door 318 has a generally C-shaped cross sectional configuration. Door 318 generally includes side portion 338, overhang portion 340 and underhang portion 342. Side portion 338 extends between overhang and underhang portion 342 and further extends vertically above and below seat 124. Side portion 338 preferably includes a handle, a lever or other actuation mechanism for locking and releasing door 318. Side portion 338 additionally includes a window and an optional armrest (not shown). Although not illustrated, side portion 338 may additionally include a restraining device such as restraining device 244 shown in FIG. 3.

Overhang portion 340 extends upwardly from side portion 338 and inwardly towards a center line of vehicle 320. As such, overhang portion 340 preferably forms a part of the roof extending above the interior area of vehicle 320. In the embodiment illustrated in FIG. 3A, overhang portion 340 is preferably solid providing additional structural strength. Alternatively, overhang portion 340 may include portions which are translucent or transparent.

Underhang portion 342 extends downwardly from side portion 338 and inwardly towards the longitudinal center line of vehicle 320. Underhang portion 342 preferably extends inwardly towards the center line of vehicle 320 beyond the inner most surface of side portion 338. Under hang portion 342 preferably extends a distant sufficient so as to provide a well for feet of the individual seated upon seat 124. As a result, side portion 338 additionally serves as a boundary of the well floor provided by underhang 342. Because underhang portion 342 and side portion 338 cooperatively form the well adjacent to seat 24, vehicle 320 is easier to enter and exit.

As shown by FIG. 3A, door 318 generally moves in an "over and in" path between a passenger loading position (shown in phantom) and a passenger carrying position (shown in solid). Door 318 and frame 350 include sealing surfaces 352 and 354 respectively, which sealingly mate when door 318 is in the passenger carrying position. Alternatively, door 318 and frame 350 may have various other configurations which also provide a sealing relationship between door 318 and frame 350 when door 318 is in the passenger carrying position.

Figure 4:
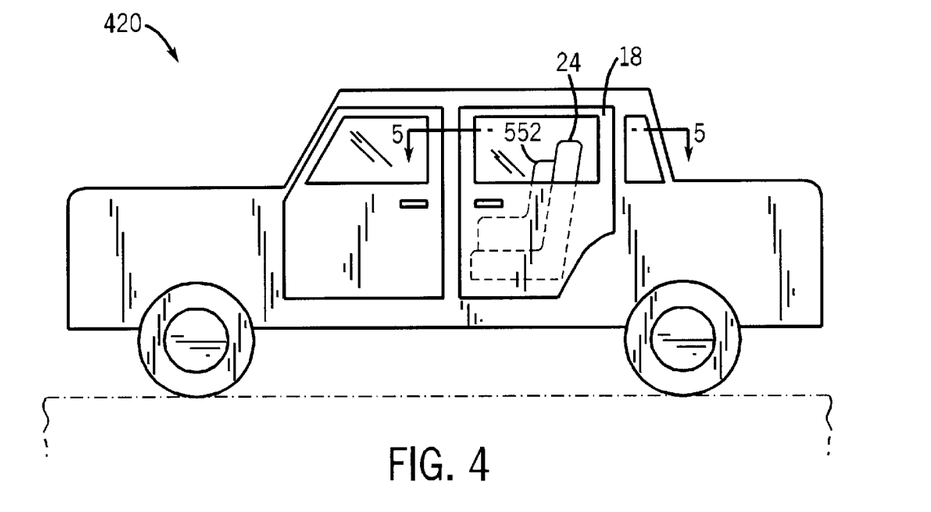
FIG. 4 is a side elevational view of a vehicle including a fifth preferred embodiment of the seating system.
Figure 5:
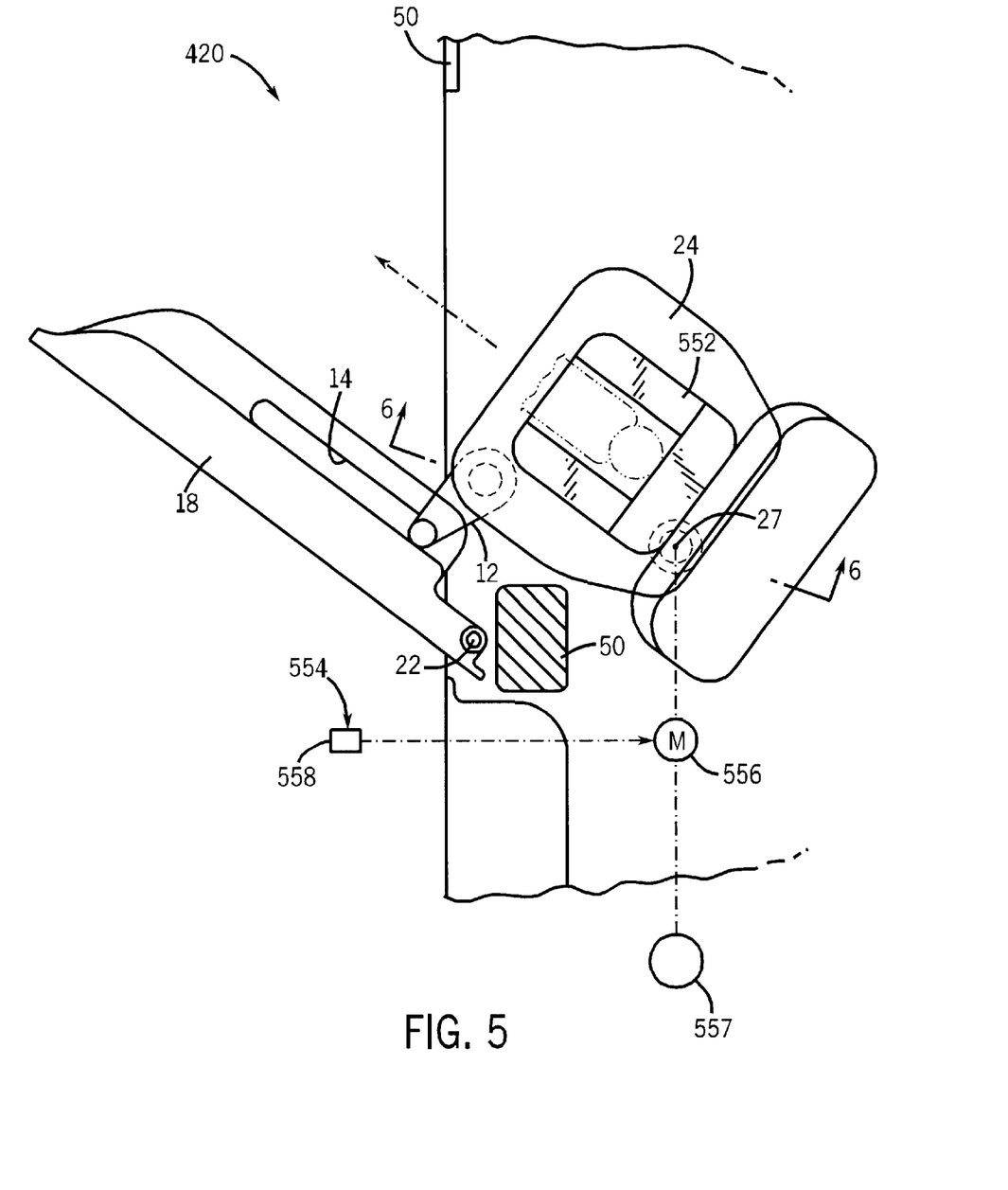
FIG. 5 is a fragmentary sectional view of a vehicle and seating system of FIG. 4 taken along line 5—5.

FIGS. 4 and 5 illustrate vehicle 420, a fifth alternative embodiment of vehicle 20. In particular, FIG. 4 is a side elevation of a vehicle 420, while FIG. 5 is a sectional view of vehicle 420 taken along line 5—5 of FIG. 4. As best shown by FIG. 5, vehicle 420 is similar to vehicle 120, except that vehicle 420 additionally includes child restraining unit 552 and seating system actuation mechanism 554. Those remaining components of vehicle 420 which correspond to similar components of vehicle 20 are numbered similarly. Child restraining unit 552 is conventionally known and releasably mounts to seat 24. Child restraining unit 552 includes one or more straps which provide supplemental restraint to protect a child seated upon seat 24.

Although child restraining unit 552 is illustrated as preferably comprising a forward-facing unit, child restraining unit 552 may alternatively comprise a rearward-facing unit such as those commonly employed for seating children under the age of one. Although child restraining unit 552 is preferably removably mounted to seat 24, child restraining unit 552 may alternatively be integrally formed as a single unitary body with seat 24 or may be permanently mounted to seat 24. As will be appreciated, the exact configuration of child restraining unit 552 may vary depending upon the size or age of child being supported. Child restraining unit 552 may also comprise those child restraining units which are developed in the future. Because movement of door 18 from the passenger carrying position to the passenger loading position automatically pivots seat 24 such that child restraining unit 552 is in more alignment with the opening in frame 50 when door 18 is ajar, child restraining unit 552 is more easily accessed and the child in restraining unit 552 may be more easily lifted and removed from vehicle 520.

Seat system actuation mechanism 554 is coupled to at least one of door 18 and seat 24 and is configured to rotatably drive at least one of door 18 or seat 24 to cause door 18 to move between the passenger carrying position and the passenger loading position. In the particular embodiment illustrated in FIG. 5, actuation mechanism 554 is coupled to seat 24 and is configured to rotatably drive seat 24 about axis 27 such that door 18 also pivots about axis 22 between the passenger carrying position and the passenger loading position. As shown by FIG. 5, mechanism 554 generally includes motor 556, main signal generation device 557 and remote signal generation device 558. Motor 556 (schematically illustrated in FIG. 5) comprises a conventionally known or future developed motor configured to rotatably drive seat 24 about axis 27. Although motor 556 may comprise a pneumatic or hydraulically driven motor, motor 556 preferably comprises an electrically driven motor. Motor 556 rotatably drives seat 124 in response to control signals generated by main signal generation device 557 mounted to or supported by frame 50 of vehicle 420. For example, device 557 may include a control circuit that is mounted as part of a dash or console in vehicle 420, wherein the control circuit generates a control signal as a result of a person within vehicle 420 providing appropriate input. Such appropriate input may take on a variety of forms such as a person within vehicle 420 depressing a button on the dash or console, or such as the person within vehicle 520 actuating a latch or lock upon door 18.

As shown by FIG. 5, motor 556 also rotatably drives seat 24 in response to an optional remote signal generation device 558. Remote signal generation device 558 comprises a conventionally known or future developed device configured to generate a control signal which causes motor 556 to actuate between various active states and an inactive state. In the exemplary embodiment, device 558 comprises a conventionally known remote keyless entry device configured to generate a wireless signal which actuates motor 556. As will be appreciated, remote signal generation device 558 may perform additional functions such as those of a conventionally known remote keyless entry.

Figure 6:
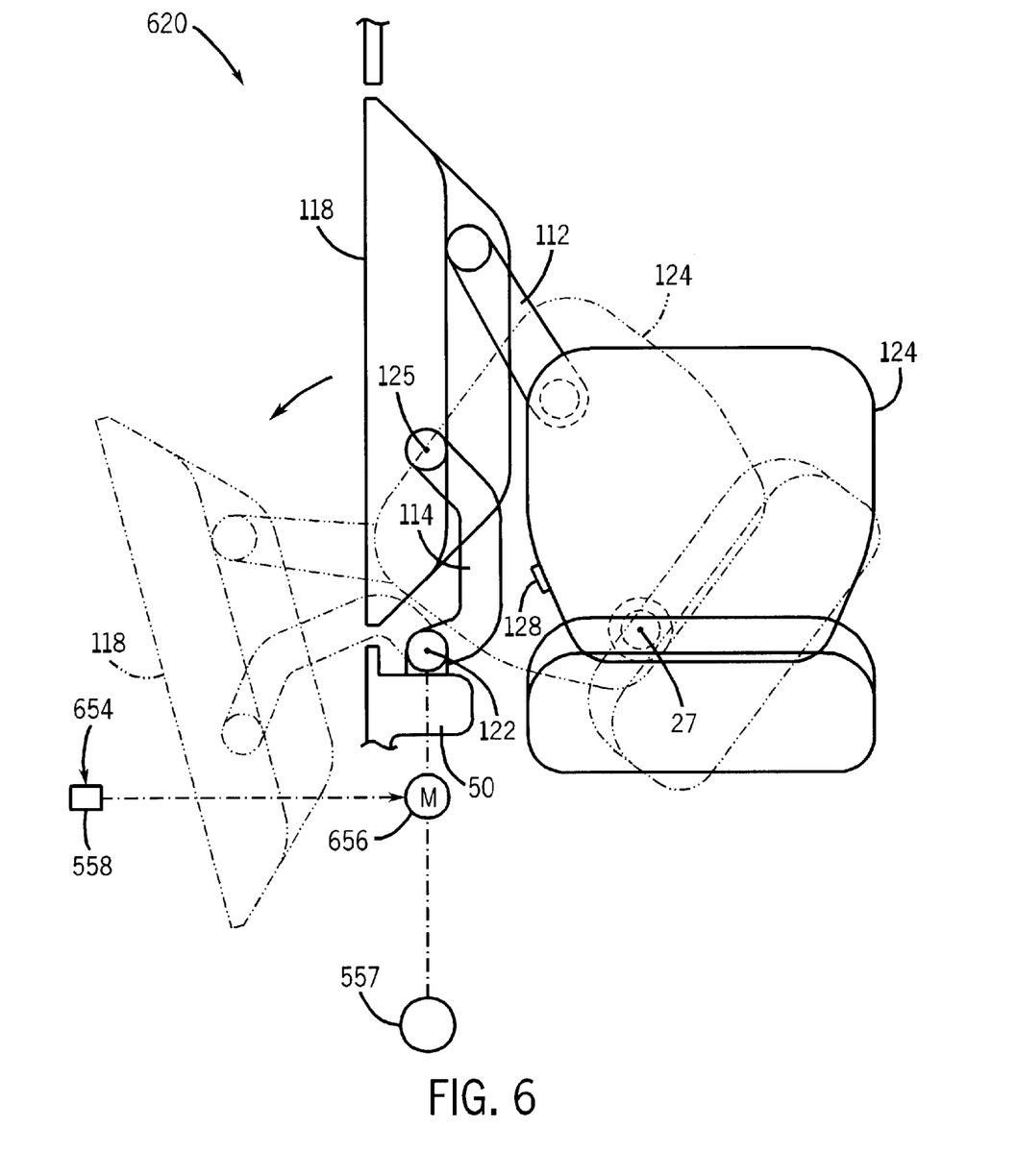
FIG. 6 is a fragmentary sectional view of a vehicle including a sixth preferred embodiment of the seating system with the door in a generally closed position (and with the door in a generally open position shown in phantom).

FIG. 6 illustrates vehicle 620, an alternative embodiment of vehicle 120. Vehicle 620 is similar to vehicle 120 except that vehicle 620 additionally includes seat system actuation mechanism 654. Similar to seat system actuation mechanism 554, mechanism 654 is configured to rotatably drive at least one of door 118 and seat 124 between the passenger loading position and the passenger carrying position. In the exemplary embodiment, mechanism 654 is configured to rotatably drive door 118 about axis 27 which in turn causes seat 124 to pivot about axis 22. Mechanism 654 generally includes motor 656, main signal generation device 657 and remote signal generation device 558. Motor 656 is substantially identical to motor 656, except that motor 656 is coupled to slave link 114 so as to pivot slave link 114 about axis 122. As a result, motor 656 rotatably drives door 118 about axes 122 and 125. Like motor 556, motor 656 preferably comprises an electrically driven motor which actuates between an inactive state and one or more active states, providing different speeds in response to control signals from either main signal generation device 557 or remote signal generation device 558. Like vehicle 520, vehicle 620 enables a passenger to cause door 118 and seat 124 to pivot between a forward-facing position and a unloading position by a single input such as a single voice command, such as a simple depressment or actuation of a button or a lever, or by a single other input. As a result, ingress into or egress from vehicle 620 is more convenient and easy.

Figure 7:
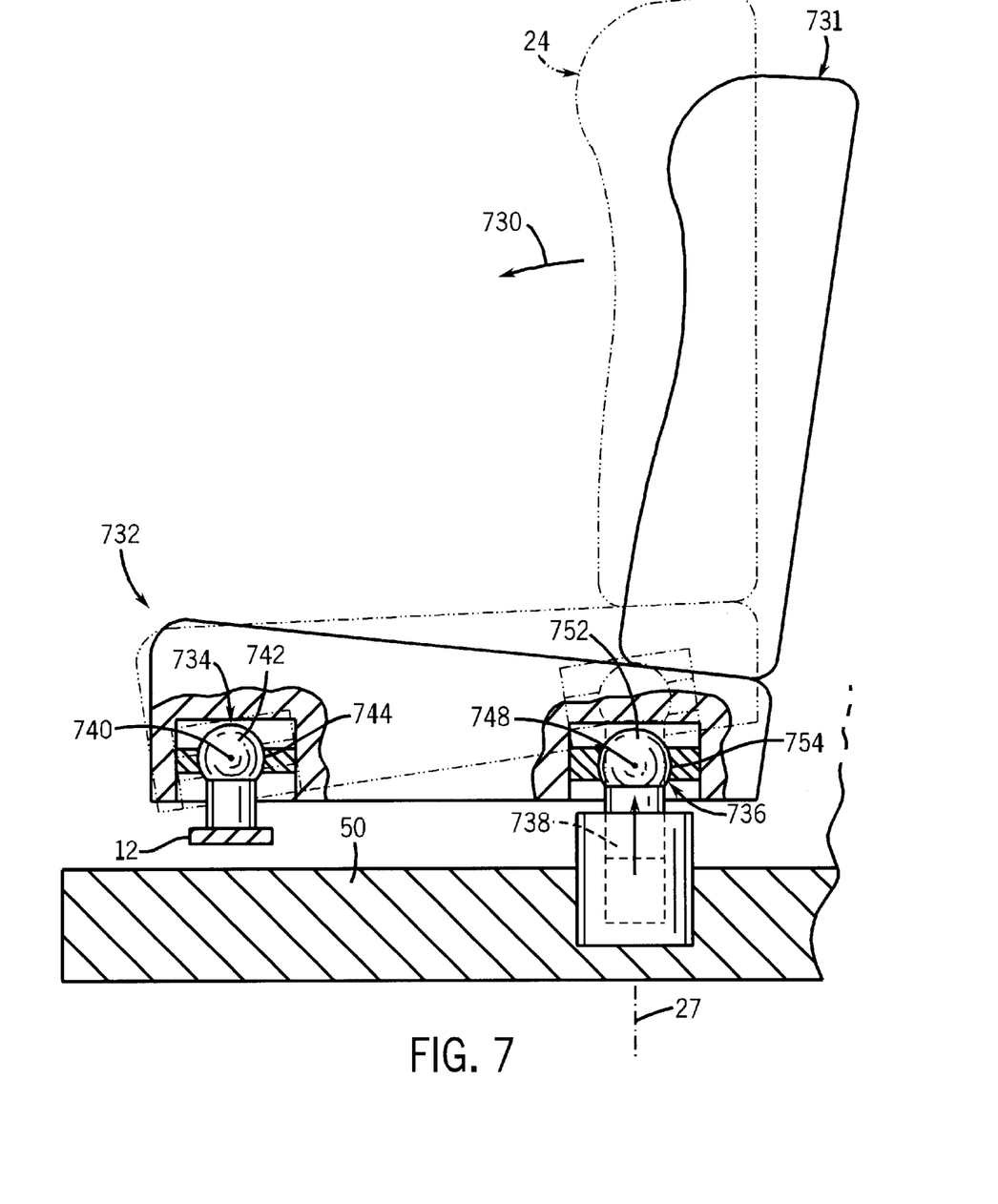
FIG. 7 is a fragmentary sectional view of a seat of the seating system of FIG. 1 illustrating tilting of the seat in phantom.

FIG. 7 is a sectional view illustrating one particular embodiment of seat 24 in greater detail. As shown by FIG. 7, seat 24 is further configured to pivot about a generally horizontal axis in the direction indicated by arrow 730 as seat 24 rotates about axis 27 from the forward-facing position shown in solid in FIG. 1 to the unloading position shown in phantom in FIG. 1. In particular, seat 24 is preferably configured such that either a rear portion of seat 24 proximate rear portion 731 rises upwardly as seat 24 pivots towards the unloading position or such that front portion 732 of seat 24 is lowered as seat 24 moves towards the unloading position. In the exemplary embodiment, the rear portion 731 of seat 24 rises up or elevates as seat 24 moves towards the unloading position. As shown by FIG. 7, seat 24 includes front joint 734, rear joint 736 and actuation device 738. Front joint 734 couples the remainder of seat 24 to extension 12 while enabling seat 24 to pivot relative to extension 12 about axis 740. In the embodiment illustrated, joint 734 is composed of a sphere or ball 742 coupled to extension 12 and a corresponding socket 744 formed and coupled to the remainder of seat 24. Socket 744 receives ball 742 to enable pivotal movement of seat 24 about axis 740 relative to extension 12.

Joint 736 couples seat 24 to frame 50 and is configured to enable seat 24 to pivot about a generally horizontal axis 748 relative to frame 50. In the embodiment illustrated, joint 736 is composed of a sphere or ball 752 coupled to frame 50 and a corresponding socket 754 coupled to or formed as part of seat 24. Ball 752 is preferably coupled to frame 50 via intermediate actuation device 738. In alternative embodiments, ball 752 may be directly coupled to frame 50 where other means are provided for pivoting seat 24 about a generally horizontal axis.

Although joints 734 and 736 are illustrated as comprising a socket coupled to or formed as part of seat 24 which receives a corresponding ball coupled to either extension 12 or frame 50, either joint arrangement may be reversed such that seat 24 includes a ball which is received within a socket coupled to extension 12 or frame 50, directly or indirectly. Moreover, in lieu of utilizing ball and socket joints to enable front portion 732 and rear portion 731 of seat 24 to pivot about a generally horizontal axis, various other structural arrangements or mechanical joints may be employed to enable the same relative movement.

Actuation device 738 is coupled between frame 50 and joint 736. Actuation device 738 is configured to elevate rear portion 731 of seat 24 as seat 24 moves towards the passenger unloading position. Device 738 is also preferably configured to lower rear portion 731 of seat 24 as seat 24 pivots towards the forward-facing position. In the embodiment illustrated, actuation device 738 comprises an electrically driven motor which drives a screw coupled to ball 752 to raise and lower rear portion 731 of seat 24. The motor of actuation device 738 elevates rear portion 731 of seat 24 in response to a signal from a signal generation device such as a control circuit coupled to a sensor, or a switch which generates the control signal in response to initiation of movement of seat 24 towards the unloading position. For example, a sensor, such as potentiometer, may be provided for sensing rotational movement of seat 24, wherein a control circuit generates the control signal in response to signals from the potentiometer to cause actuation of device 738. In embodiments where pivotal movement of door 18 and seat 24 are both automatically driven by a rotary actuator or other mechanism, initial actuation of the rotary actuator or other actuation device to rotatably drive the seat and door may also be configured to initiate actuation of device 738.

Although actuation device 738 is illustrated and described in conjunction with seating system 10 of vehicle 20, an identical device 738 may alternatively be employed with seating system 110 of vehicle 120. Although device 738 is illustrated as elevating rear portion 731 of seat 24 as seat 24 rotates towards the unloading position, device 738 may alternatively be configured to lower front portion 732 as seat 24 pivots towards the unloading position. Furthermore, device 738 may alternatively be configured to both raise rear portion 731 and lower front portion 732 of seat 24 as seat 24 moves towards the unloading position. In lieu of utilizing a motor or other actuation mechanism to raise or lower portions of seat 24 in response to movement of seat 24 between the forward-facing position and an unloading position, other mechanisms may be employed for pivoting seat 24 about a generally horizontal axis. For example, various cam and cam follower arrangements may be employed which would cause seat 24 to pivot about a generally horizontal axis so as to tilt seat 24 downwardly and forwardly as seat 24 is moved towards the unloading position. The relative movement of the cam and cam follower may be powered or may be as a result of the passenger pushing or manually pivoting the door towards the fully ajar position, or moving the door towards the closed position.

Because seat 24 is preferably configured to tilt or pivot downwardly and forwardly as seat 24 moves from the forward-facing position towards the unloading position, exiting seat 24 is more convenient and easier. This ease of egress is especially advantageous to those individuals who have physical impairments which would otherwise make egress from the vehicle more difficult. Although less desirable, seat 24 may alternatively be configured to omit device 738 such that seat 24 simply rotates between the forward-facing position and the unloading position without any tilting or reorientation of seat 24 about a generally horizontal axis.

Overall, the described vehicle seating systems interconnect the door and the pivotably mounted seat by at least one rigid member that causes opening and closing of the door to also pivot the seat between the passenger carrying or riding position and a passenger loading position. In the passenger loading position, the seat is more aligned with the opening formed between the door and the frame when the door is ajar. Consequently, entry and exit into and from the vehicle is improved. This improved entry and exit from the vehicle enables the actual opening about the door itself to be reduced in size. Because the seating systems enable the reduction in the size of the door opening, the vehicle may be provided with additional framing or additional structure about the door opening without increasing the overall size or weight of the vehicle. As a result, the vehicle is provided with greater rigidity and strength for improved safety.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A vehicle seating system for use with a vehicle including a vehicle frame having a front, a rear, a first side and a second side, the seating system comprising:
   a door having a front portion adapted to be positioned proximate the front of the vehicle frame and a rear portion adapted to be positioned proximate the rear of the vehicle frame, wherein the door is adapted to be rearwardly hinged to the vehicle frame proximate the rear portion of the door;
   a seat adapted to be pivotably coupled to the vehicle frame;
   at least one rigid member having a first portion coupled to the seat and a second portion coupled to the door, wherein pivotal movement of the door rotates the seat between a passenger riding position in which the seat faces the front of the vehicle frame and a passenger loading position in which the seat faces an open space formed between the door and the vehicle frame when the door is ajar.

2. The vehicle seating system of claim 1, wherein the at least one rigid member includes:
   an extension coupled to the door at a first door location; and
   a slave link having a first portion adapted to be pivotably coupled to the frame and a second portion pivotably coupled to the door at a second door location.

3. The vehicle seating system of claim 2, wherein the door has a C-shaped cross sectional configuration.

4. The vehicle seating system of claim 2, wherein the door includes an overhang portion.

5. The vehicle seating system of claim 4, wherein the overhang portion is at least partially transparent.

6. The vehicle seating system of claim 4, wherein the door includes an armrest and wherein the overhang portion inwardly extends beyond the armrest.

7. The vehicle seating system of claim 2 including a restraining system disposed within the door.

8. The vehicle seating system of claim 1, wherein one of the door and the seat includes an elongate slot and wherein the at least one rigid member includes an arm coupled to the other of the door and the seat, the arm having a portion slidably disposed within the slot.

9. The vehicle seating system of claim 8, wherein the door includes the slot and wherein the arm is coupled to the seat.

10. The vehicle seating system of claim 1, wherein the vehicle frame forms a front interior area and a rear interior area and wherein the seat is adapted to be positioned in the rear interior area.

11. The vehicle seating system of claim 1, wherein the seat includes a child restraining unit.

12. The vehicle seating system of claim 1, wherein the seat is configured to mount a child restraining unit.

13. The vehicle seating system of claim 1, wherein the seat is configured to tilt towards the open space as the seat moves from the passenger riding position towards the passenger loading position.

14. The vehicle seating system of claim 13, wherein the seat has a front portion and a rear portion and wherein the rear portion is elevated as the seat moves from the passenger riding position towards the passenger loading position.

15. The vehicle seating system of claim 1 including a rotational actuator coupled to one of the door and the seat, wherein the rotational actuator rotates the door and the seat.

16. The vehicle seating system of claim 15 including:
   a control circuit coupled to the rotational actuator; and
   a main signal generation device adapted to be coupled to the vehicle frame, wherein the rotational actuator rotates the door and the seat in response to signals generated by the main signal generation device.

17. The vehicle seating system of claim 15 including:
   a control circuit coupled to the rotational actuator; and
   a remote signal generation device, wherein the rotational actuator rotates the door and the seat in response to signals generated by the remote signal generation device.

18. A vehicle comprising:
   a vehicle frame having a front, a rear, a first side and a second side;
   a door pivotably coupled to the vehicle frame;
   a seat pivotably coupled to the vehicle frame, wherein the seat includes an extension coupled to the door at a first door location; and
   a slave link having a first portion pivotably coupled to the vehicle frame and a second portion pivotably coupled to the door at a second door location.

19. The vehicle of claim 18, wherein the door has a front portion proximate the front of the frame and a rear portion proximate the rear of the frame and wherein the door is pivotably coupled to the vehicle frame proximate the rear portion.

20. The vehicle of claim 19, wherein the vehicle frame forms a front interior area and a rear interior area and wherein the seat is in the rear interior area.

21. The vehicle of claim 18, wherein the vehicle frame forms a front interior area and a rear interior area and wherein the seat is in the rear interior area.

22. The vehicle of claim 18 including a pivot support pivotably supporting the seat relative to the vehicle frame.

23. The vehicle of claim 18, wherein the seat pivots between a passenger riding position in which the seat faces the front of the vehicle frame and a passenger loading position in which the seat faces an open space formed between the door and the vehicle frame when the door is ajar.

24. The vehicle of claim 23, wherein the seat pivots at least approximately 45 degrees between the passenger riding position and the passenger loading position.

25. The vehicle of claim 23 including a latch mechanism coupled between the seat and the vehicle frame, wherein the latch mechanism releasably retains the seat in the passenger riding position.

26. The vehicle of claim 18, wherein the door has a C-shaped cross sectional configuration.

27. The vehicle of claim 18, wherein the door includes an overhang portion.

28. The vehicle of claim 27, wherein the overhang portion is transparent.

29. The vehicle of claim 27, wherein the door includes an armrest and wherein the overhang portion inwardly extends beyond the armrest.

30. The vehicle of claim 18 including a restraining system disposed within the door.

31. The vehicle of claim 23, wherein the seat is configured to tilt towards the open space as the seat moves from the passenger riding position towards the passenger loading position.

32. The vehicle of claim 23, wherein the seat has a front portion and a rear portion and wherein the rear portion is elevated as the seat moves from the passenger riding position towards the passenger loading position.

33. The vehicle of claim 18 including a rotational actuator coupled to one of the door and the seat, wherein the rotational actuator rotates the door and the seat.

34. A vehicle seating system for use with a vehicle having a front, a rear, a first side, a second side, a vehicle frame, a seat and a door, the system comprising:
 a pivot support adapted to pivotably support the seat relative to the vehicle frame;
 an extension adapted to be coupled to the seat and adapted to be pivotably coupled to the door at a first door location;
 a slave link having a first portion adapted to be pivotably coupled to the vehicle frame and a second portion adapted to be pivotably coupled to the door at a second door location.

35. The system of claim 1, wherein the seat is adapted to be pivotably coupled to the vehicle frame for rotation about a substantially vertical axis.

36. The vehicle seating system of claim 1, wherein the seat is adapted to pivot between a passenger riding position in which the seat faces the front of the vehicle frame and a passenger loading position in which the seat faces an open space formed between the door and the vehicle frame when the door is ajar.

37. The vehicle seating system of claim 36, wherein the seat is adapted to pivot at least 45 degrees between the passenger riding position and the passenger loading position.

38. The vehicle seating system of claim 36, including a latch mechanism adapted to be coupled between the seat and the vehicle frame, wherein the latch mechanism is adapted to releasably retain the seat in the passenger riding position.

39. The vehicle seating system of claim 36, wherein the seat is configured to tilt towards the open space as the seat moves from the passenger riding position towards the passenger loading position.

40. The vehicle seating system of claim 36, wherein the seat has a front portion and a rear portion and wherein the rear portion is elevated as the seat moves from the passenger riding position towards the passenger loading position.

41. The vehicle seating system of claim 1 including a rotational actuator coupled to one of the door and the seat, wherein the rotational actuator rotates the door and the seat.

42. The vehicle seating system of claim 9, wherein the slot opens along an axis substantially parallel to the door.

43. The vehicle of claim 18, wherein the seat is pivotably coupled to the vehicle frame for rotation about a substantially vertical axis.

44. The system of claim 34, wherein the pivot support is adapted to pivotably support the seat for rotation about a substantially vertical axis relative to the vehicle frame.

45. The system of claim 34, wherein the pivot support is adapted to pivotably support the seat for movement between a passenger riding position in which the seat faces the front of the vehicle and a passenger loading position in which the seat faces an open space formed between the door and the vehicle frame when the door is ajar.

46. The system of claim 45, wherein the pivot support is adapted to pivotably support the seat movement at least 45 degrees between the passenger riding position and the passenger loading position.

47. The system of claim 45 including a latch mechanism adapted to be coupled between the seat and the vehicle frame, wherein the latch mechanism is configured to releasably retain the seat in the passenger riding position.

48. The system of claim 45, wherein the pivot support is configured to tilt the seat towards the open space as the seat moves from the passenger riding position towards the passenger loading position.

49. The system of claim 45, wherein the seat has a front portion and a rear portion and wherein the pivot support is configured to elevate the rear portion of the seat as the seat moves from the passenger riding position towards the passenger loading position.

50. The system of claim 34 including a rotational actuator adapted to be coupled to one of the door and the seat, wherein the rotational actuator is configured to rotation at least one of the door and the seat.

51. A vehicle seating system for use with a vehicle including a vehicle frame having a front, a rear, a first side and a second side, the seating system comprising:
 a door adapted to be pivotably coupled to the vehicle frame;
 a seat adapted to be pivotably coupled to the vehicle frame, wherein the seat includes an extension coupled to the door at a first door location; and
 a slave link having a first portion adapted to be pivotably coupled to the vehicle frame and a second portion pivotably coupled to the door at a second door location.

52. A system for use with a vehicle including a vehicle frame, the system comprising:
 a door;
 an extension coupled to the door at a first door location and adapted to be coupled to the vehicle frame, wherein the extension is adapted to be pivotably coupled to at least one of the door and the frame; and
 a slave link having a first portion adapted to be pivotably coupled to the frame and a second portion pivotably coupled to the door at a second door location.

53. The system of claim 51, including a seat adapted to be pivotably coupled to the vehicle frame, wherein the extension is pivotably coupled to the frame by the seat.

54. The system of claim 51, wherein the vehicle frame has a front and a rear and wherein the door has a front portion adapted to be positioned proximate the front of the vehicle frame and a rear portion adapted to be positioned proximate the rear of the vehicle frame, wherein the first door location at which the extension is coupled to the door is the front portion of the door and wherein the second door location at which a slave link is pivotably coupled to the door is at the rear portion of the door so that the door is adapted to be rearwardly hinged to the vehicle frame proximate the rear portion of the door.

* * * * *